United States Patent
Lim et al.

(10) Patent No.: US 9,148,851 B2
(45) Date of Patent: Sep. 29, 2015

(54) METHOD AND TERMINAL FOR SEARCHING FOR AN ACCESS POINT

(75) Inventors: Jaewon Lim, Gyeonggi-do (KR); Song Chong, Daejeon (KR); Jeonghoon Mo, Seoul (KR); Jihwan Kim, Daejeon (KR); Byoung-Hoon Kim, Gyeonggi-do (KR); Jeongho Kwak, Daejeon (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 172 days.

(21) Appl. No.: 13/817,870

(22) PCT Filed: Mar. 2, 2011

(86) PCT No.: PCT/KR2011/001439
§ 371 (c)(1),
(2), (4) Date: Feb. 20, 2013

(87) PCT Pub. No.: WO2012/023683
PCT Pub. Date: Feb. 23, 2012

(65) Prior Publication Data
US 2013/0155896 A1    Jun. 20, 2013

Related U.S. Application Data

(60) Provisional application No. 61/375,294, filed on Aug. 20, 2010.

(51) Int. Cl.
*H04B 7/26* (2006.01)
*H04B 7/185* (2006.01)
(Continued)

(52) U.S. Cl.
CPC .......... *H04W 52/0206* (2013.01); *H04W 48/16* (2013.01); *H04W 48/04* (2013.01)

(58) Field of Classification Search
CPC ............. H04B 7/2606; H04B 7/18582; H04B 7/18508; H04W 88/04; H04W 80/04; H04W 88/06; H04J 1/10; H04J 1/14; H04J 3/08
USPC .......................... 370/315, 316, 328, 492, 501
See application file for complete search history.

(56) References Cited

U.S. PATENT DOCUMENTS 6,522,881 B1    2/2003    Feder et al.
2006/0217147 A1    9/2006    Olvera-Hernandez et al.
(Continued)

FOREIGN PATENT DOCUMENTS

KR    10-2006-0093020 A    8/2006
KR    10-2007-0060367 A    6/2007

OTHER PUBLICATIONS

International Search Report issued in corresponding International Patent Application No. PCT/KR2011/001439 dated Oct. 31, 2011.

*Primary Examiner* — Ronald B Abelson
(74) *Attorney, Agent, or Firm* — Morgan, Lewis & Bockius LLP

(57) ABSTRACT

Specifically, according to one embodiment of the present invention, a method for searching for an access point is provided. The method for searching may comprises the steps of: a terminal measuring the position thereof; checking an access point located near the measured position of the terminal; determining whether or not the distance between the terminal and the access point is greater than the radius range searchable by the terminal; and searching for the access point when the distance between the terminal and the access point is less than the radius range.

9 Claims, 5 Drawing Sheets

(51) Int. Cl.
*H04W 88/04* (2009.01)
*H04W 80/04* (2009.01)
*H04W 88/06* (2009.01)
*H04J 1/10* (2006.01)
*H04J 1/14* (2006.01)
*H04J 3/08* (2006.01)
*H04W 52/02* (2009.01)
*H04W 48/16* (2009.01)
*H04W 48/04* (2009.01)

(56) References Cited

U.S. PATENT DOCUMENTS

| | | | |
|---|---|---|---|
| 2007/0002725 A1* | 1/2007 | Nystrom et al. | 370/208 |
| 2007/0066304 A1 | 3/2007 | Lee | |
| 2008/0089269 A1* | 4/2008 | Tsutsui | 370/316 |
| 2010/0271263 A1* | 10/2010 | Moshfeghi | 342/378 |
| 2011/0304503 A1* | 12/2011 | Chintalapudi et al. | 342/357.29 |

* cited by examiner (a)

(b)

(a) $D(t) < R_{in}$ (b) $D(t) < R_{out}(t)$, $RSS > RSSth$ (c) $R_{in} < D(t) < R_{out}$

METHOD AND TERMINAL FOR SEARCHING FOR AN ACCESS POINT

TECHNICAL FIELD

The present invention relates to a method of searching for an access point and apparatus therefor.

BACKGROUND ART

A $2^{nd}$ generation mobile communication means to transmit/receive a digitized audio and includes such as CDMA, GSM and the like. GPRS evolved from the GSM is proposed. The GPRS is a technology to provide a packet switched data service based on the GSM system.

A $3^{rd}$ generation mobile communication means to enable to transmit/receive an image and data as well as an audio. 3GPP (third generation partnership project) developed a mobile communication system (IMT-2000) and adopted a WCDMA as a radio access technology (hereinafter abbreviated RAT). In Europe, the IMT-2000 technology and the radio access technology (RAT) e.g., WCDMA are called an UMTS (universal mobile telecommunication system) in total. And, UTRAN is an abbreviation of UMTS terrestrial radio access network.

Meanwhile, the $3^{rd}$ generation mobile communication is evolving to a $4^{th}$ generation mobile communication.

A long-term evolution network (LTE) technology standardizing by the 3GPP and an IEEE 802.16 technology standardizing by IEEE are proposed as a technology of the $4^{th}$ generation mobile communication. A terminology "E-UTRAN (evolved-UTRAN)" is used by the LTE.

Meanwhile, all traffics occurred by a current user are hard to be handled even by the $3^{rd}$ generation or the $4^{th}$ generation mobile communication system in some point. Hence, a communication technology performed by IEEE 802.11, which is called WiFi, is recently disseminated. In the following description, it shall be described with reference to diagrams.

FIG. 1 is a diagram for showing a relationship between a mobile communication system and WiFi.

Referring to FIG. 1, a terminal 10 is locate at a coverage of a first base station 21 and at least one or more access points (AP) 31/32 are located at the coverage of a second base station 22. And, at least one access point (AP) 33 is located at the coverage of a second base station 23.

The terminal 10 may be able to access the first base station 21 to use a data service. Yet, the terminal 10 may be able to perform a search to access an access point (AP) if necessary. However, to continuously perform the search, in case that there does not exist an accessible access point near the terminal 10 as shown in FIG. 1, may cause a result of power waste of the terminal.

Meanwhile, a technology for saving power consumption in WiFi technology exists as a scheme for saving power in a manner of controlling a sleep mode and an idle mode in case of being connected (or associated) to an access point only and does not exist for a technology to search for the access point in case of not being connected to the access point.

On the other hand, although a search for an access point may be performed with a low frequency due to a power consumption of a terminal, there is a lot of cases that should utilize WiFi as much as possible depending on an application installed in a smartphone, which is recently spotlighted.

In particular, there is an application allowing a transit delay to some extent among applications of the smartphone. If an access point is searched no later than an allowed time for the transit delay of data, the application transmits data in a manner of accessing the access point. Yet, to continuously perform a search for the access point may have a drawback causing a significant power consumption.

Therefore, it is necessary to efficiently manage a power consumed for searching for an access point based on WiFi.

DISCLOSURE OF THE INVENTION

Technical Task

Accordingly, an object of the embodiments proposed by the present specification is to enable to search for an access point in a manner of minimizing power consumption as mentioned in the foregoing description.

Technical Solution

To achieve the aforementioned object, according to one embodiment of the present invention, the present invention proposes a method of reducing power consumption by performing a search for an access point in a manner of utilizing an information on a position of a terminal only in case that the terminal does not have access (associate) to a WiFi based access point.

Specifically, according to one embodiment of the present invention, the terminal measures a current position and calculates a distance between the position and an access point located at the nearest from the position. If the distance is sufficiently far, the terminal calculates a time necessary for a next position measurement based on the distance from the access point and makes the terminal not perform a position measurement and a search until the time. On the other hand, according to one embodiment of the present invention, if the distance from the nearest access point is sufficiently close, the terminal searches for an access point with a configured time interval and performs the position measurement of the terminal once with a long time interval.

And, according to one embodiment of the present invention, the terminal may prevent an additional power consumption by distinguishing whether the terminal is located indoor or outdoor using a signal strength of a cellular just before performing the position measurement and by not performing the position measurement in case that the terminal is located indoor.

More specifically, according to one embodiment of the present invention, a method of performing a search for an access point is provided. The method of searching for an access point includes the steps of measuring a position of a terminal by the terminal, checking the access point located near the position of the terminal obtained from a measurement result, determining whether a distance between the terminal and the access point is greater than a radius range searchable by the terminal, and if the distance between the terminal and the access point is smaller, searching for the access point.

Preferably, the method further includes the step of determining whether RSS of a signal received from a serving base station is greater than a threshold value, if the RSS is greater than the threshold value, the steps may be performed.

Preferably, if the distance between the terminal and the access point is greater, the method further includes the steps of checking whether the terminal has accessed the access point before in a coverage of a currently accessed serving base station and controlling a search interval according to whether the terminal has accessed the access point before.

Preferably, the method further includes the step of determining whether the distance between the terminal and the access point is greater than a service radius of the access point. If the distance between the terminal and the access point is greater, the above-mentioned searching step or a searching step in the following may be performed.

More preferably, a timing point of a next position measurement is determined by a time resulted from dividing a distance between the terminal and a nearest access point from the terminal by a speed of the terminal for a specific time.

Preferably, if the distance between the terminal and the access point is greater than the radius range searchable by the terminal, a timing point of a next position measurement is determined and then a search for the access point may be stopped until the determined timing point.

Preferably, if an accessible access point is found by the search, the method further includes the steps of accessing the access point and storing a cell ID of a base station to which the terminal belongs at the time of the access.

Meanwhile, according to one embodiment of the present invention, a terminal, which is able to access a mobile communication base station and an access point, is provided. The terminal includes a position measuring unit, a first transmitting/receiving unit configured to transceive a signal with the mobile communication base station, a second transmitting/receiving unit configured to transceive a signal with the access point, and a controller controlling the position measuring unit to measure a position, the controller controlling the position measuring unit to check the access point located near the position of the terminal obtained from a measurement result, the controller controlling the position measuring unit to determine whether a distance between the terminal and the access point is greater than a radius range searchable by the terminal, if the distance between the terminal and the access point is smaller, the controller controlling the second transmitting/receiving unit to search for the access point.

Preferably, the controller measures RSS of the signal received from the base station via the first transmitting/receiving unit and if the RSS is greater than a threshold value, a search may be performed.

Preferably, if the distance between the terminal and the access point is greater, the controller checks whether the terminal has accessed the access point before in a coverage of a currently accessed serving base station and may be able to control a search interval according to whether the terminal has accessed the access point before.

Preferably, the controller determines whether the distance between the terminal and the access point is greater than a service radius of the access point and if the distance between the terminal and the access point is smaller, a search may be performed.

Preferably, if the distance between the terminal and the access point is greater than the radius range searchable by the terminal, the controller determines a timing point of a next position measurement and may be then able to stop searching for the access point until the determined timing point.

Preferably, if an accessible access point is found by a search, the controller accesses the access point in a manner of controlling the second transmitting/receiving unit and may be able to store a cell ID of a base station to which the terminal belongs.

Advantageous Effects

According to one embodiment proposed by the present specification, a terminal may reduce power consumption by searching for an access point in a manner that the terminal utilizes an information on a position of the terminal only.

And, according to one embodiment of the present invention, the terminal may prevent an additional power consumption by distinguishing whether the terminal is located indoor or outdoor using a signal strength of a cellular just before performing a position measurement and by not performing the position measurement in case that the terminal is located indoor.

BEST MODE

Mode for Invention

Figure 1:
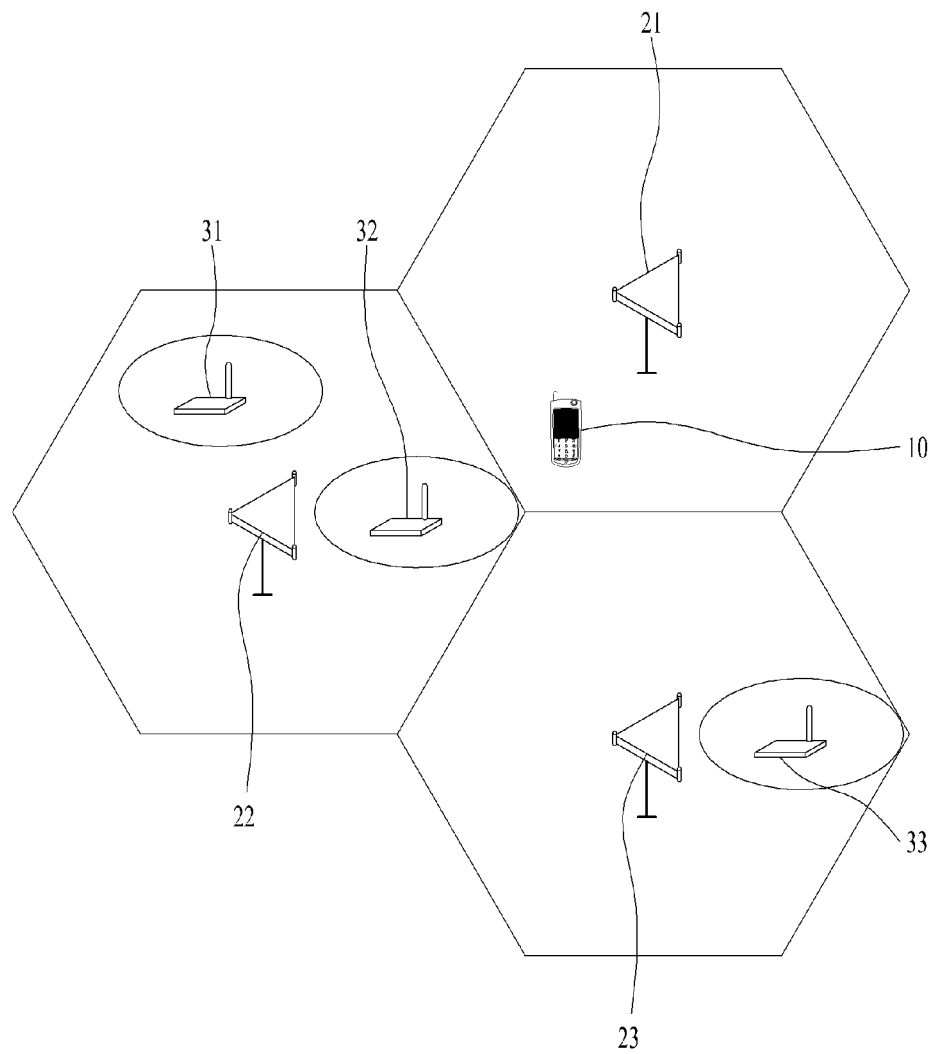
FIG. 1 is a diagram for showing a relationship between a mobile communication system and WiFi.

The technical terminologies used in the present specification are used only to describe a specific embodiment(s) and have no intention to restrict the present invention. The technical terminologies used in the present specification should be construed not as excessively inclusive meanings or excessively reduced meanings but as meanings generally understood by those having ordinary skill in the technical field, to which the present invention pertains, unless defined as other meanings especially in the present specification. If the technical terminologies used in the present specification fail in correctly representing the idea of the present invention, they should be substituted with technical terminologies correctly understandably by those having ordinary skill in the technical field to which the present invention pertains. Moreover, general terminologies used by the present invention may be construed not as the excessively reduced meanings but as the meanings defined in dictionaries or the sequence of the context.

And, the singular number representation used in the present specification may include the plural number representation unless mentioned clearly and differently in context. In the present application, such a terminology as 'configured', 'include' and the like should be construed not as necessarily including various components or steps written in the present specification but as including the components or steps in part or further including additional components or steps.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In case that one component is mentioned as 'connected to' or 'accessing' another component, it may be connected to or access the corresponding component in direct. Yet, new component(s) may exist in between. On the other hand, in case that one component is mentioned as 'directly connected to' or 'directly accessing' another component, it should be understood that new component(s) may not exist in between.

In the following description, a preferable embodiment according to the present invention is explained in detail with reference to the attached drawings. The same reference numbers will be used throughout the drawings to refer to the same or like parts in this specification irrespective of the sign of the drawings and the overlapped explanation on the corresponding content can be omitted. And, in describing the present invention, if the detailed description of the related art is determined as making the point of the present invention unclear, it will be omitted. The accompanying drawings, which are included to provide a further understanding of the invention and are incorporated in and constitute a part of this specification, illustrate embodiments of the invention and together with the description serve to explain the principles of the invention only. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

In the following description, a terminology such as a terminal is used. Yet, the terminal may also be called a user equipment (UE), a mobile equipment (ME), a mobile station (MS), a user terminal (UT), a subscriber station (SS), a mobile subscriber station (MSS), a wireless device, a handheld device, and an access terminal.

Figure 2:
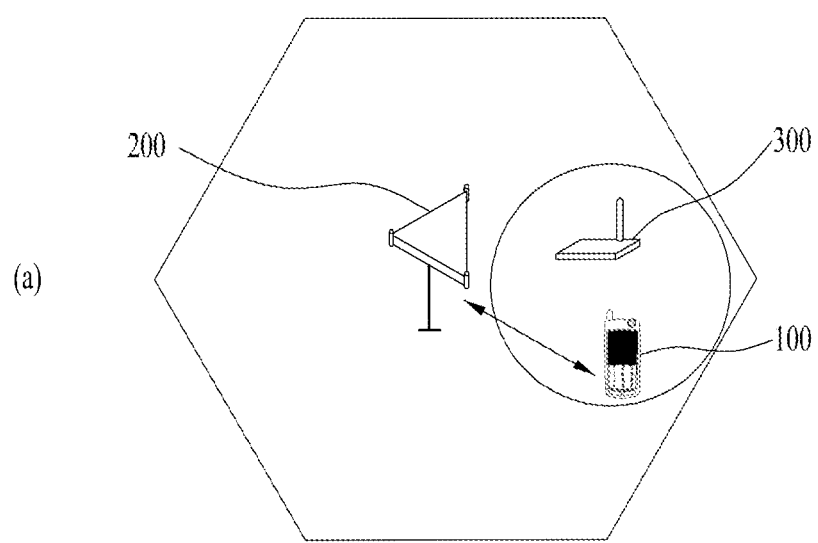
FIG. 2 is an exemplary diagram to describe a method of searching for an access point using a position information.
Figure 2:
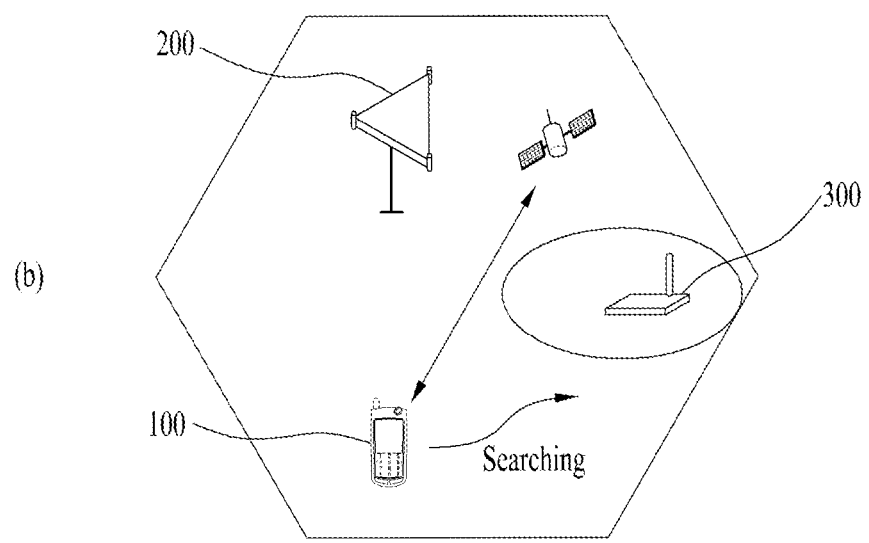

FIG. 2 is an exemplary diagram to describe a method of searching for an access point using a position information.

Referring to FIG. 2, a terminal 100 may check a position of the terminal and may be then able to identify whether there is an access point nearby the terminal using a database.

A method of finding out a position of the terminal may include a method of identifying the position of the terminal from a cell ID of a base station 200 as shown in FIG. 2 (a). It is able to search for an access point 300 in a manner of analyzing the cell ID of the base station 200 in case that the access point 300 has already been found once in the coverage of the base station or an access movement to a different base station is not taking place for more than a prescribed time. In particular, in case that the base station 200 is not changed since the terminal 100 did not move, a search for an access point 300 is performed. The search for the access point is performed with a basically configured time interval. In this case, as the number of performing the search for the access point in the coverage of an identical base station increases, a time difference between the configured timing points may increase. In particular, in case of searching for an $n^{th}$ wireless LAN network, the time difference may increase to an interval of n*X minutes (X is less than 5 minutes). The configured interval may be initialized in case that a base station position of a cellular is changed.

Yet, this method does not have a significant benefit on a region having few or no access point. And, in case that a coverage size of a base station is big, although a terminal is practically moving fast, the base station is not changed. The method does not have a benefit on the above-mentioned case.

Meanwhile, another method of finding out a position of the terminal may include a method using a GPS as shown in FIG. 2 (b).

Yet, to continuously perform a position measurement using a GPS or a Galilean satellite has a drawback of excessive power consumption.

Therefore, in the following description, a method of performing an efficient search for an access point with minimum power consumption is explained in detail.

Figure 3:
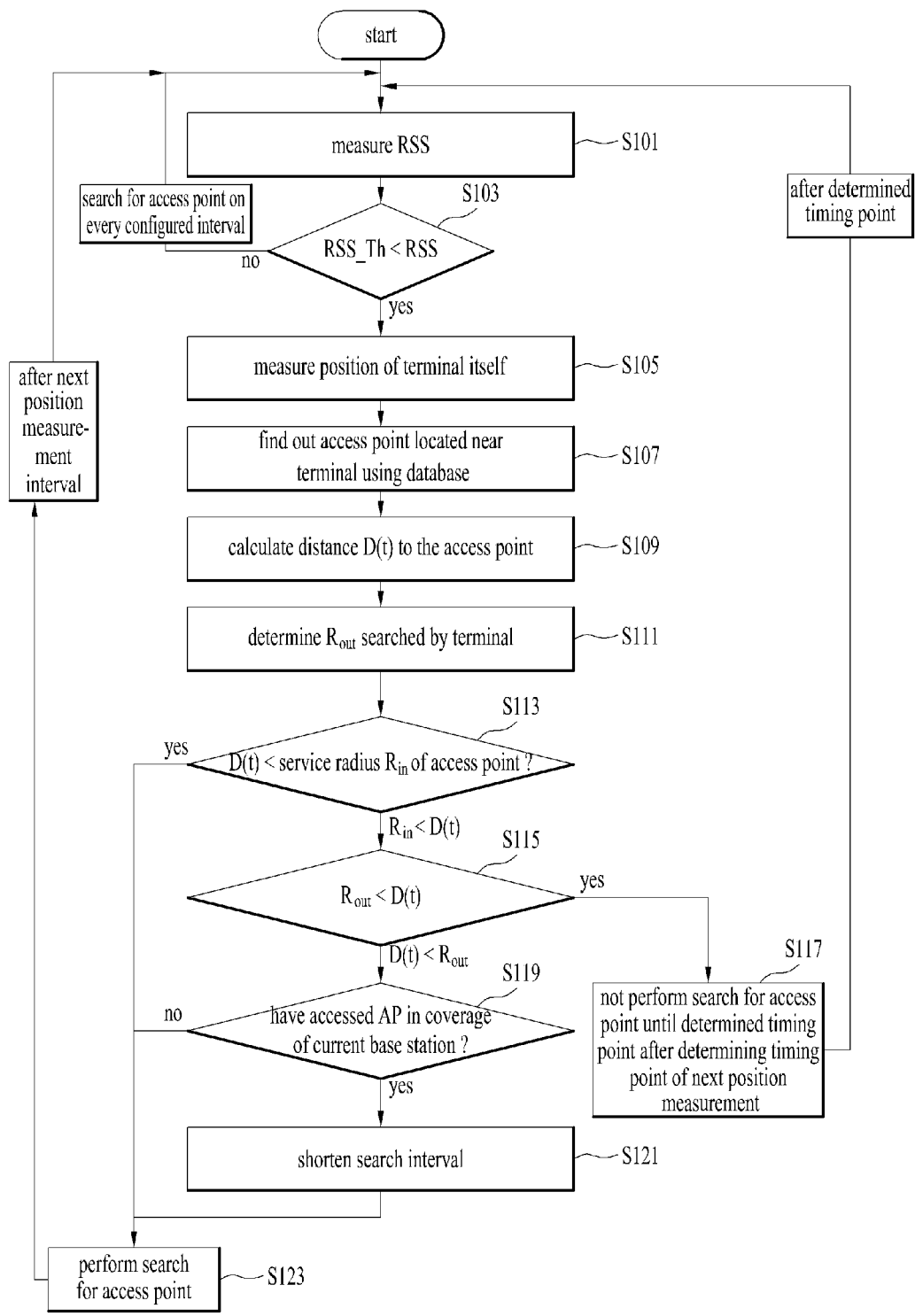
FIG. 3 is a flowchart to describe a method of searching for an access point using a position information.
Figure 4:
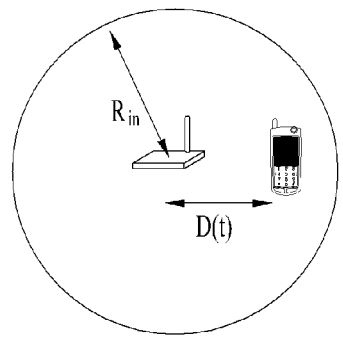
FIG. 4 is an exemplary diagram for showing each of cases in FIG. 3.
Figure 4:
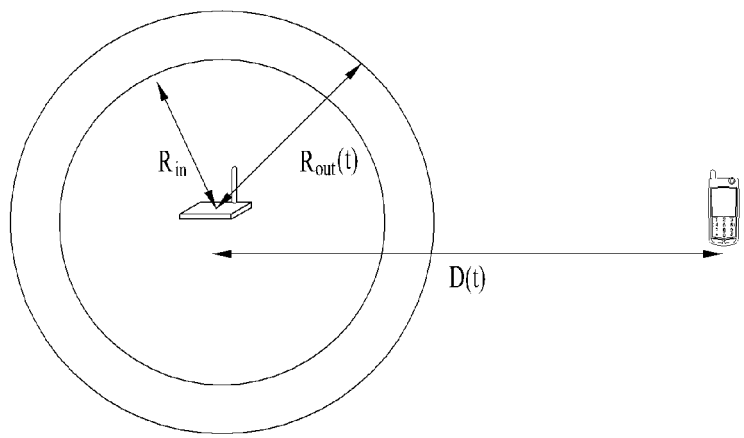
Figure 4:
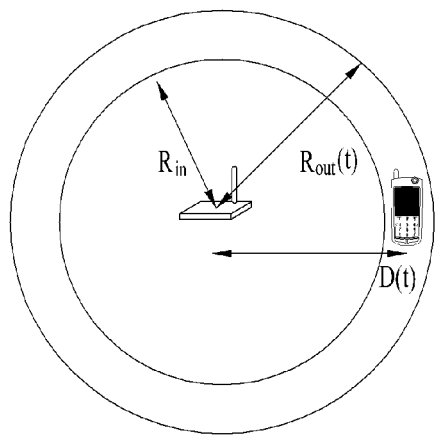

FIG. 3 is a flowchart to describe a method of searching for an access point using a position information and FIG. 4 is an exemplary diagram for showing each of cases in FIG. 3.

Referring to FIG. 3, a terminal 100 measures RSS based on a signal received from a base station [S101]. In doing so, the terminal 100 may be able to know a cell ID from the signal received from the base station and an information on the received signal strength (RSS).

The terminal determines whether the RSS value is smaller than a threshold value (RSS_TH) [S103]. In case that the RSS of the received signal is smaller than the threshold value, the terminal 100 determines that the terminal is located indoor and then does not perform a position measurement until the RSS value is over the threshold value. In particular, in case that the RSS is greater than the threshold value, since it is quite probable that the terminal is located outdoor, accuracy is secured when a position measurement is performed. In case that the RSS is smaller than the threshold value, since it is quite probable that the terminal is located indoor, it is unable to perform the position measurement or accuracy is not secured when the position measurement is performed. It may lead to unnecessary power consumption of the terminal.

Therefore, in case that the RSS is greater than the threshold value, the terminal 100 performs a position measurement and finds out the position of the terminal [S105]. The position measurement may be performed using a global positioning system (GPS) or a Galilean satellite. Or, the position measurement may be based on a triangulation performed by signals received from nearby base stations. Or, the position measurement may be based on an OMA SUPL technology.

Subsequently, the terminal 100 finds out an access point located near the terminal in a manner of searching for a database using a keyword, which is the position of the terminal [S107]. The database information may be obtained from a specific service by accessing an internet or may be the information obtained from a core network via a mobile communication network.

And, the terminal 100 calculates a distance (D(t)) between the terminal and the found access point [S109].

Subsequently, the terminal 100 determines a radius ($R_{OUT}$) for the terminal to perform a search for an access point [S111]. The radius ($R_{out}$) for performing the search may be changed by power consumption ($P_L$) consumed by the use of a position measurement technology and accuracy (X).

$$R_{out}(t) = D(t)_{|P_L(T_f(t))=P_S(I_{S,basic})} + X \quad \text{[Formula 1]}$$

The terminal 100 determines whether the D(t) is smaller than a service radius ($R_{in}$) of the access point [S113]. A case that the D(t) is smaller than the service radius ($R_{in}$) of the access point corresponds to FIG. 4 (a). As shown in FIG. 4 (a), in case that the distance (D(t)) is smaller than the service radius ($R_{in}$) of the access point, the terminal performs a search for an access point [S123].

Yet, in case that the distance (D(t)) is greater than the service radius ($R_{in}$) of the access point ($R_{in}$<D(t)), the terminal determines whether the radius for performing the search ($R_{out}$) is smaller than the distance (D(t)), i.e., $R_{out}$<D(t) [S115].

In case that the radius for performing the search ($R_{out}$) is smaller than the distance (D(t)) as shown in FIG. 4(b), the terminal determines a timing point of a next position measurement and then does not perform a search for an access point until the determined timing point [S117]. Specifically, the terminal calculates a time difference ($T_f(t)$) between the timing point of a current position measurement and the timing point of a next position measurement. In this case, the time difference ($T_f(t)$) is the time resulted from dividing a distance between the terminal and the nearest access point from the terminal by an average speed of position measurements recently performed by the terminal for s times. If RSS of a signal received from a base station after $T+T_f(t)$ amount of time is over the threshold value, the terminal performs a position measurement.

$$T_f(t) = \min((D - R_{in})/V(t), T_{I,max}) \quad \text{[Formula 2]}$$

In this case, V(t) is an average speed of position measurements recently performed for s times and may be represented as follows.

$$V(t) = \sum_{k=0}^{s-1} \frac{v(t-k)}{s}$$

In this case, $T_{I,max}$ is a maximum value of position measurement time difference. 't' is a count value of a position measurement and 's' is a count for calculating an average speed. It is used for determining how many recent position measurements are used for calculating the average speed.

Meanwhile, in case that the radius for performing the search ($R_{out}$) is not smaller than the distance (D(t)), i.e., (D(t)<$R_{out}$) as shown in FIG. 4(c), the terminal determines whether the terminal has accessed the access point before in a coverage of a base station to which the terminal belongs [S119].

If the terminal has accessed (associated) the access point before, the terminal shortens a search interval [S121]. Specifically, the terminal 100 shortens a basic search interval ($I_{S,basic}$).

$$I_{S,basic} = \frac{I_{S,basic,max} - I_{S,basic,min}}{R_{out}(t) - R_{in}}(R_{in} - D(t)) + I_{S,basic,max} \quad \text{[Formula 3]}$$

In this case, $I_S$ is a base station search interval of an access point, $I_{S,basic,max}$ is a maximum value (e.g., 5 minutes) of a basic search interval of the access point, and $I_{S,basic,min}$ is a minimum value (e.g., 1 minute) of the basic search interval of the access point.

$$I_S = \min(n \times I_{S,basic}, I_{S,max}) \quad \text{[Formula 4]}$$

In this case, $I_{S,max}$ is a maximum access point search interval and 'n' is the number of performing a search for access point.

And, the terminal 100 searches for an access point [S123]. In this case, if an access point is not found by the search, the terminal increases a search interval in proportion to the number of performing the search.

Meanwhile, if an access point is found by the search, the terminal accesses (associates) the found access point and then stores a cell ID of the base station to which the terminal belongs at the time of the access.

Meanwhile, while the search is repeated, in case that the terminal performs a position measurement once again since the time has reached to the maximum value of the position measurement interval, if a state of $R_{in}=D(t)<R_{out(t)}$ is still maintained, the basic search interval ($I_{S,basic}$) may be increased or shortened in proportion to the distance (D(t)) between the access point and the terminal.

Figure 5:
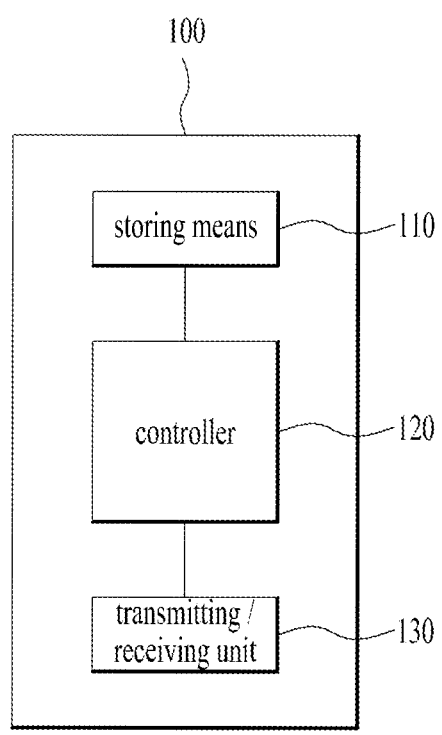
FIG. 5 is a block diagram for showing a configuration of a terminal 100 according to the present invention.

FIG. 5 is a block diagram for showing a configuration of a terminal 100 according to the present invention.

As shown in FIG. 5, the terminal 100 includes a storing means 110, a controller 120, and a transmitting/receiving unit 130. The transmitting/receiving unit may include a first transmitting/receiving unit for a mobile communication and a second transmitting/receiving unit for a short-range communication. Specifically, the first transmitting/receiving unit may be able to support WCDMA, LTE, or LTE-A. The second transmitting/receiving unit may be able to support IEEE 802.11 technology.

The storing means 110 stores a method depicted in FIG. 2 to FIG. 4.

The controller 120 controls the storing unit 110 and the transmitting/receiving unit 130. Specifically, the controller 120 executes each of the methods stored in the storing means 110. And, the controller 120 transmits the aforementioned signals via the transmitting/receiving unit 130.

While the present invention has been described and illustrated herein with reference to the preferred embodiments thereof, since the scope of the present invention is not limited to the specific embodiment, the present invention covers the modifications, variations and improvements of this invention that come within the scope of the appended claims and their equivalents.

What is claimed is:

1. A method of searching for an access point, the method comprising:
    measuring a position of a terminal by the terminal;
    checking the access point located near the position of the terminal obtained from a measurement result;
    determining whether a distance between the terminal and the access point is greater than or equal a radius range searchable by the terminal; and
    if the distance between the terminal and the access point is less than the radius range searchable by the terminal, searching for the access point and accessing the access point when the access point is found by the search and is accessible,
    wherein a cell ID of a base station to which the terminal belongs at the time of the access is stored, and
    wherein, if the distance between the terminal and the access point is greater than or equal to the radius range searchable by the terminal, a timing point of a next position measurement is determined and a search for the access point is stopped until the determined timing point.

2. The method of claim 1, further comprising:
    determining whether received signal strength (RSS) of a signal received from a serving base station is greater than a threshold value,
    wherein, if the RSS is greater than the threshold value, the operations of claim 1 are performed.

3. The method of claim 1, further comprising:
    if the distance between the terminal and the access point is greater than the radius range searchable by the terminal, checking whether the terminal has accessed the access point before in a coverage of a currently accessed serving base station; and
    controlling a search interval according to whether the terminal has accessed the access point before.

4. The method of claim 1, further comprising determining whether the distance between the terminal and the access point is greater than a service radius of the access point.

5. The method of claim 1, wherein the timing point of the next position measurement is determined by a time resulted from dividing a distance between the terminal and a nearest access point from the terminal by a speed of the terminal for a specific time.

6. A terminal, which is able to access a mobile communication base station and an access point, the terminal comprising:
   a position measuring unit;
   a first transmitting/receiving unit configured to transceive a signal with the mobile communication base station;
   a second transmitting/receiving unit configured to transceive a signal with the access point; and
   a controller configured to:
      control the position measuring unit to measure a position;
      control the position measuring unit to check the access point located near the position of the terminal obtained from a result of the measurement;
      control the position measuring unit to determine whether a distance between the terminal and the access point is greater than or equal to a radius range searchable by the terminal;
      if the distance between the terminal and the access point is less than the radius range searchable by the terminal:
         control the second transmitting/receiving unit to search for the access point; and
         access the access point when the access point is found by the search and is accessible,
   wherein a cell ID of a base station to which the terminal belongs is stored, and
   wherein, if the distance between the terminal and the access point is greater than or equal to the radius range searchable by the terminal, the controller is further configured to:
      determine a timing point of a next position measurement, and
      control the position measuring unit to stop searching for the access point until the determined timing point.

7. The terminal of claim 6, wherein:
   the controller is further configured to measure received signal strength (RSS) of the signal received from the base station via the first transmitting/receiving unit; and
   if the RSS is greater than a threshold value, a search is performed.

8. The terminal of claim 6, wherein:
   if the distance between the terminal and the access point is greater, the controller is further configured to check whether the terminal has accessed the access point before in a coverage of a currently accessed serving base station; and
   the controller is further configured to control a search interval according to whether the terminal has accessed the access point before.

9. The terminal of claim 6, wherein:
   the controller is further configured to determine whether the distance between the terminal and the access point is greater than a service radius of the access point; and
   if the distance between the terminal and the access point is less than the service radius of the access point, a search is performed.

* * * * *